Feb. 13, 1923.
F. W. CURNAN
ENVELOPE FASTENER
Filed Oct. 19, 1921
1,445,298
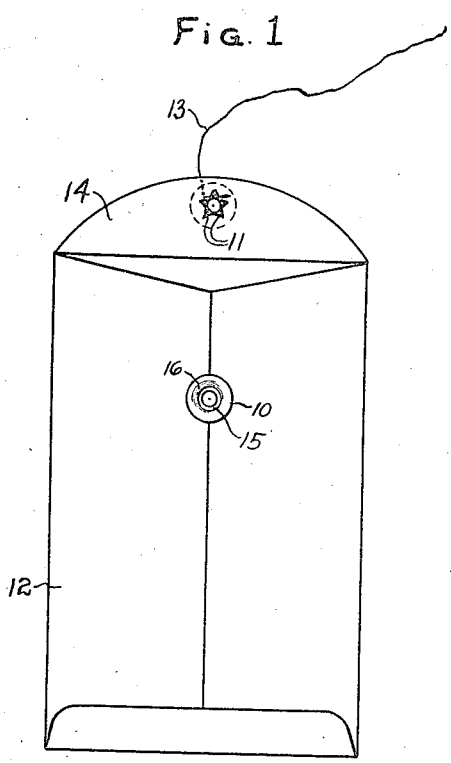
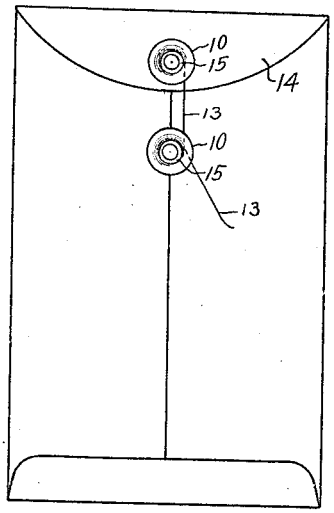
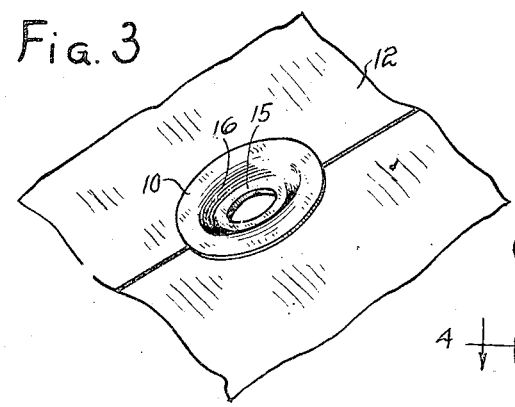
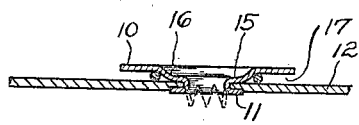
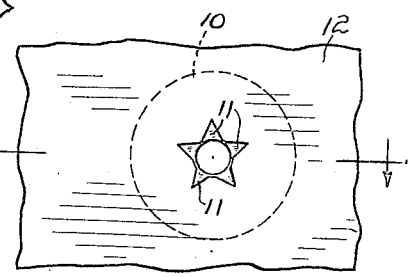
INVENTOR
Frank W. Curnan
BY
A. M. Wooster
ATTORNEY Patented Feb. 13, 1923.

1,445,298

UNITED STATES PATENT OFFICE.

FRANK W. CURNAN, OF DERBY, CONNECTICUT.

ENVELOPE FASTENER.

Application filed October 19, 1921. Serial No. 508,651.

*To all whom it may concern:*

Be it known that I, FRANK W. CURNAN, a citizen of the United States, residing at Derby, county of New Haven, State of Connecticut, have invented an Improvement in Envelope Fasteners, of which the following is a specification.

This invention relates to envelope fasteners and more particularly to that type in which a cord or string is attached either to the body or the flap of the envelope, and a securing means is attached to the other member about which the string may be wound to secure the flap in closed position.

It is an object of the invention to provide a fastener of this type which is inexpensive to manufacture and which will securely hold the flap of the envelope.

It is a further object of the invention to provide a fastener which will securely hold the flap with the string wrapped but once around the fastener.

It is a still further object of the invention to provide a fastener which may be punched from sheet stock.

With these and other objects of the invention in view I have devised the novel fastener illustrated in the accompanying drawing, in which Fig. 1 is a view of the back of an envelope showing my fastener applied thereto, the flap being open.

Fig. 2 is a similar view showing the flap fastened down.

Fig. 3 is an enlarged perspective view showing the fastener secured to an envelope.

Fig. 4 is a transverse section substantially on the line 4—4 of Fig. 5, and

Fig. 5 is a plan view of the opposite side of the envelope from that on which the fastener is mounted showing the method of securing the same to the envelope.

My fastener comprises a button, preferably of metal, which may be punched from sheet stock, preferably circular, as shown, and having a flat, annular rim portion or flange 10 throughout its outer periphery, this flat, annular or rim portion surrounding a central depressed or dished portion 15. In forming the fastener a plurality of sharp pointed prongs 11 are struck out from the central portion therof, which prongs form means for securing the fastener to the envelope or similar article. Figs. 1 and 2 of the drawing show a preferred arrangement of fasteners as applied to an envelope, there being a fastener applied to both the body of the envelope and the flap 14. The string 13 is secured at one end to one of the fasteners, preferably that on the flap 14, and is adapted to be wound about the other fastener on the envelope to secure the flap in closed position. This string, of course, may, if desired, be secured to the fastener on the body of the envelope and wound about that on the flap in securing it in closed position.

The fastener is secured to the envelope by pressing the prongs 11 through the walls thereof and then bending them over and clinching them on the opposite side, as shown in Figs. 4 and 5. This securely attaches the fastener to the envelope and clamps the same to the under wall of the dished shape portion 15 which, therefore, positions the flange 10 spaced from the surface of the envelope, as shown at 17, a distance sufficient to allow entrance of the string between this flange and the envelope without the necessity of distorting the envelope or prying up the edge of the fastener. Also, because of the peculiar shape of the walls of the dished portion 15, the inner end of the space 17 is tapered and as the string 13 is wound around the dished portion it is wedged within this taper and securely fastened by the gripping action thereof, it being necessary to wind it but once around the fastener to securely fasten the string, as shown in Fig. 2. If desired, however, this string may be extended around the fastener on the body of the envelope and then around the fastener on the flap, thus providing a plurality of strings passing over the edge of the flap.

It is not necessary to use a fastener similar to that on the body of the envelope for securing the end of the string to the flap, as shown in the present embodiment, as any other desired means for securing the same thereto may be employed, if desired. When this type of fastener is used, however, the end of the string is inserted under the flange of the fastener and is thoroughly gripped by one of the prongs 11 when the same are clinched over to secure the fastener to the envelope. Having thus set forth the nature of my invention, what I claim is:

1. A fastener of the character described comprising an annular rim, a central dish shaped base portion, and fastening means at the center thereof for securing the fastener to an envelope or like article, said base portion adapted to position the annular rim spaced from and substantially parallel with the surface of the envelope or like article.

2. An envelope fastener of the character described comprising a flat, annular rim portion, a central dish shaped base portion, said base portion adapted to position the annular rim portion spaced from and substantially parallel with the surface of an envelope, and means for securing the fastener to an envelope.

3. An envelope fastener of the character described comprising a flat, annular rim portion, a central dish shaped base portion, said base portion adapted to position the annular rim portion spaced from and substantially parallel with the surface of an envelope, and a plurality of fastening prongs struck out from the center of said base portion.

In testimony whereof, I affix my signature.

FRANK W. CURNAN.